United States Patent [19]

Cofer

[11] 4,446,337

[45] May 1, 1984

[54] METHOD AND APPARATUS FOR REVERTIVE AUTOMATIC INTERCEPT MESSAGE DELIVERY IN A TELEPHONE SYSTEM

[75] Inventor: Frank H. Cofer, Hoschton, Ga.

[73] Assignee: The Audichron Company, Atlanta, Ga.

[21] Appl. No.: 385,497

[22] Filed: Jun. 7, 1982

Related U.S. Application Data

[63] Continuation-in-part of Ser. No. 59,646, Jul. 23, 1979, abandoned.

[51] Int. Cl.³ .................. H04M 3/42; H04M 7/06
[52] U.S. Cl. ........................... 179/18 B; 179/27 FG
[58] Field of Search ........ 179/27 FG, 27 CB, 18 AH, 179/18 B, 18 FC, 18 AB

[56] References Cited

U.S. PATENT DOCUMENTS

| | | | |
|---|---|---|---|
| 2,476,888 | 7/1949 | Mitchell | 179/18 AH X |
| 3,201,523 | 8/1965 | Blashfield | 179/27 CB |
| 3,700,823 | 10/1972 | Chulak | 179/18 B |
| 3,978,294 | 8/1976 | Limiero et al. | 179/27 CA |

FOREIGN PATENT DOCUMENTS 2228182 7/1973 Fed. Rep. of Germany ........ 179/18 AB

OTHER PUBLICATIONS

"Automatic Intercept System–Organization, Objectives and Experience", by C. J. Byrne et al., International Conference on Communications, Montreal, Canada, Jun. 1971, pp. 32-1 to 32-6.
"Common Channel Interoffice Signaling: 4A Toll Crossbar Application", by K. E. Crawford et al., Bell System Technical Journal, vol. 57, No. 2, Feb. 1978, pp. 283-297.
"CCIS: Signaling the Future of Stored Program Control", G. C. Ebner and L. A. Tomko, Telephony, May 7, 1979, pp. 43-46.

Primary Examiner—Thomas W. Brown
Attorney, Agent, or Firm—Jones & Askew

[57] ABSTRACT

A method and apparatus for delivering intercept messages locally in a telephone network. A plurality of local switching offices (10, 20) are each equipped with an automatic intercept system (25) including stored information (45) about the status of telephone numbers, calls to which are intercepted. The terminating office at which the intercept condition is detected cuts through to the automatic intercept system (AIS) in the conventional manner and generates a particular class of service signal on the trunk connection (12). The AIS at the originating office includes a circuit to cut the call through to its AIS (39) upon receipt of the signal. A predetermined signal is generated by the AIS at the originating office and serves as a handshaking signal to notify the terminating office that it is properly equipped for remote delivery. After handshaking, a modem (52) under CPU control (40) is connected (50) and all information necessary for local delivery of the intercept message at the originating office is transmitted from terminating office in a differential PSK format. After receipt of the information, the trunk connection is terminated and the AIS at the originating office proceeds with the time consuming step of delivery of the audio intercept message to the caller (11). An arrangement for practicing the method on a network equipped with common channel interoffice signaling is also shown.

5 Claims, 10 Drawing Figures

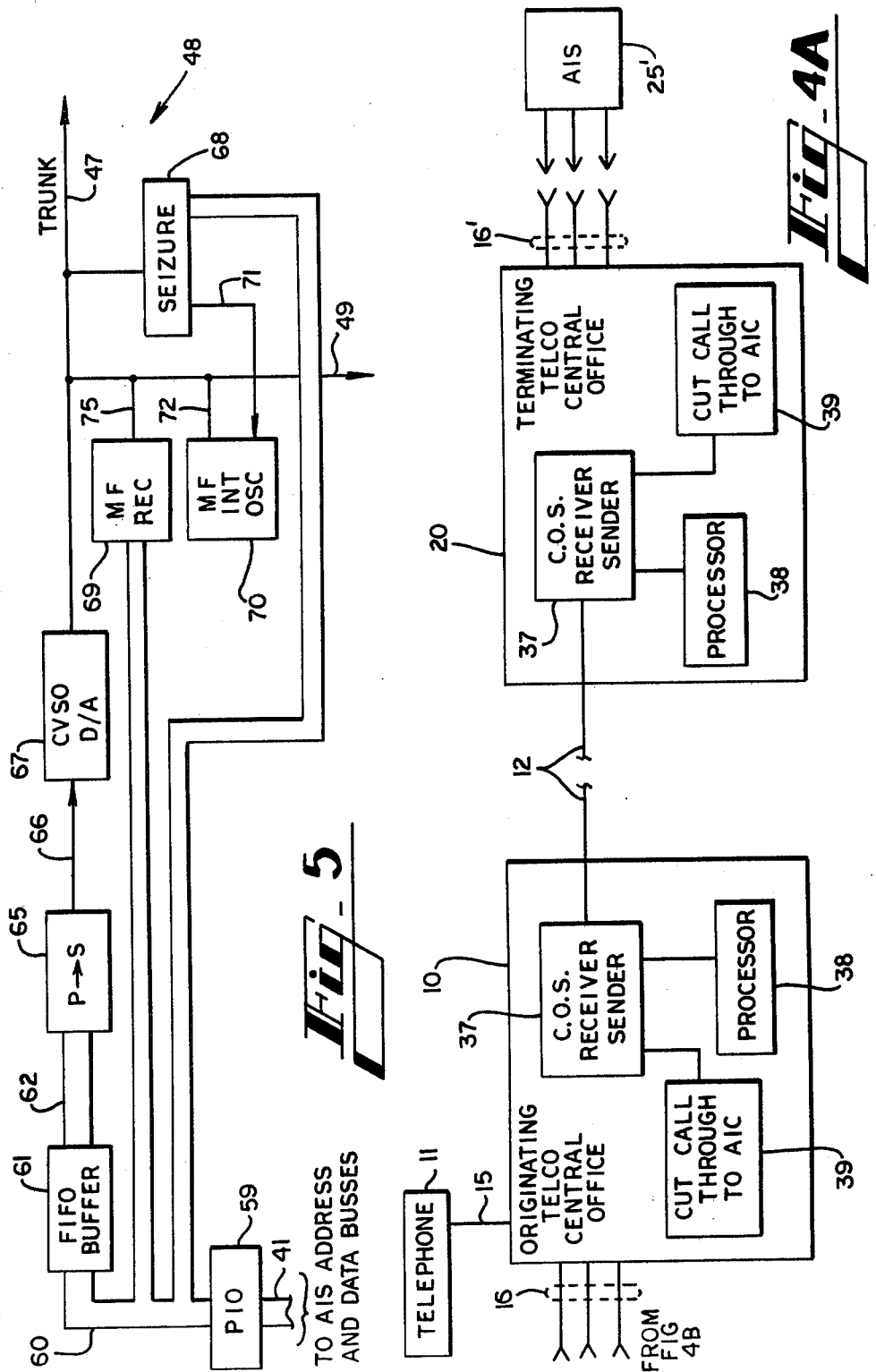

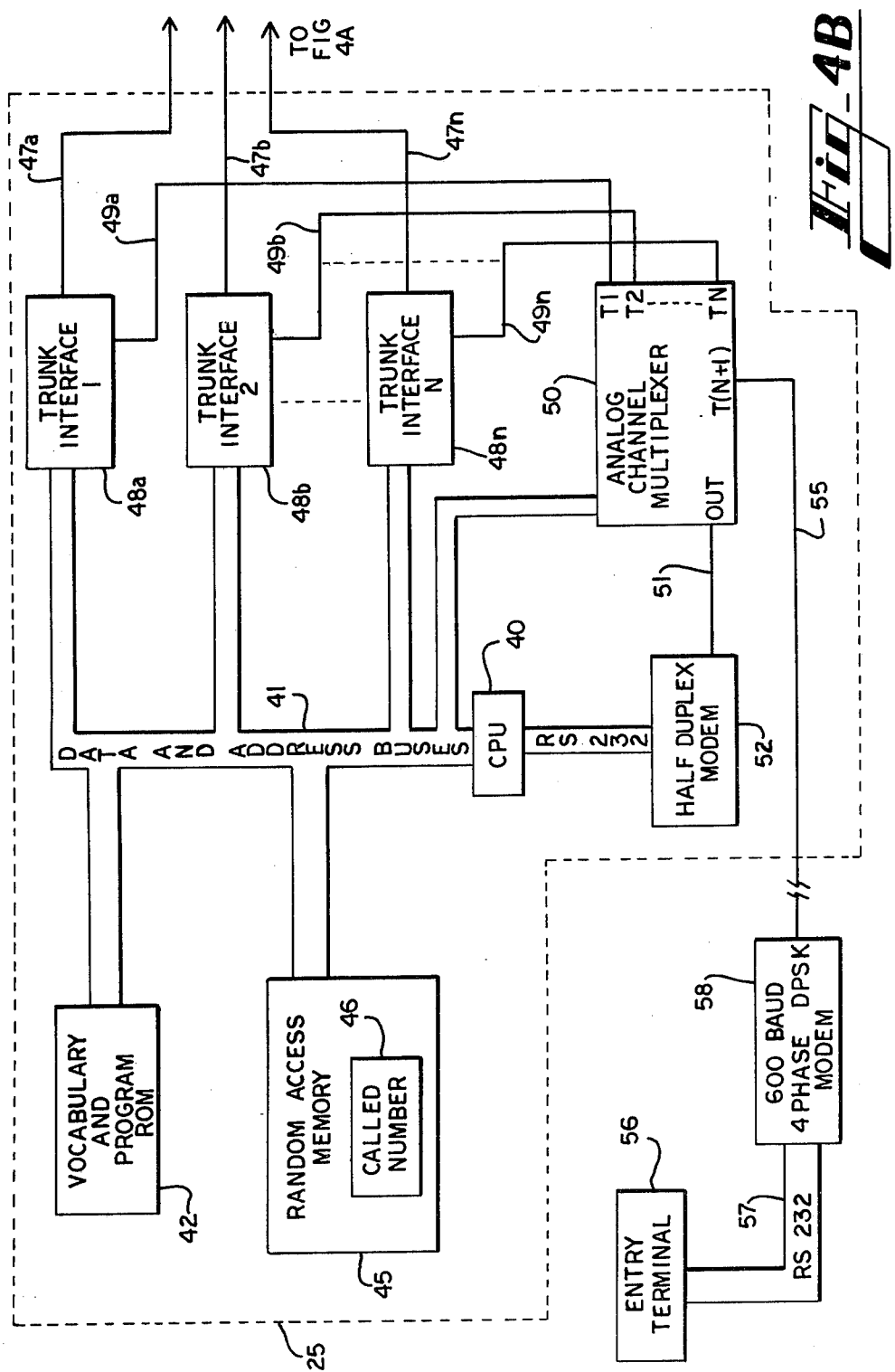

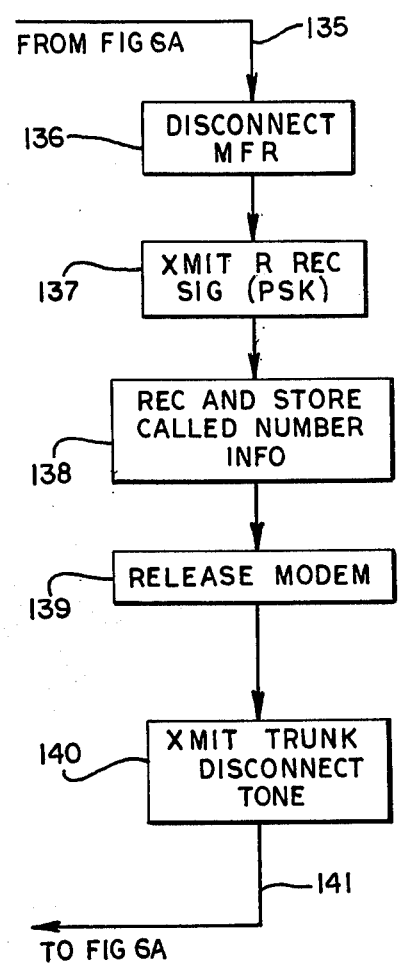
Fig_6B
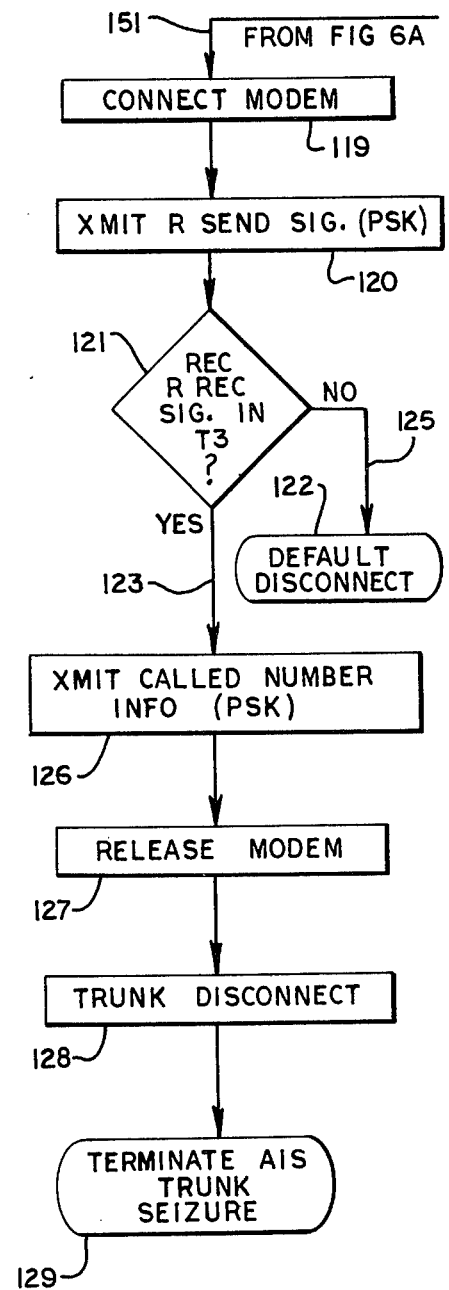
Fig_6C

METHOD AND APPARATUS FOR REVERTIVE AUTOMATIC INTERCEPT MESSAGE DELIVERY IN A TELEPHONE SYSTEM

CROSS-REFERENCE TO RELATED APPLICATIONS

This application is a continuation-in-part of application Ser. No. 59,646, filed July 23, 1979 entitled "Method and Apparatus for Revertive Automatic Intercept Message Delivery in a Telephone System", abandoned.

TECHNICAL FIELD

The present invention relates to telephony and particularly discloses an improved system for delivering intercept messages when a call placed from an originating telephone office cannot be completed.

BACKGROUND OF THE INVENTION

This invention relates in general to telephone systems and in particular to a method and apparatus for providing an intercept message.

The use of intercept messages to explain why a call cannot be completed is commonplace in telephone systems. Such intercept messages are typically initiated whenever an outgoing call cannot be completed for various reasons, such as the called number being out of service or not being a working number, so that the person who made the call receives a recorded audio message advising that his call was not completed as dialed.

Intercept messages according to the known prior art are delivered at the point of terminus of switching progress, generally the end office or intermediate switching office where an intercept condition such as congestion, delay or change has occurred. The particular audio intercept message is returned along a trunk circuit to the originating office, so that the calling party can receive the message.

In the case of calls placed on long haul trunk circuits between distant locations, or between different countries, the conventional return of audio intercept messages creates a number of undesirable effects upon the telephone network and the calling public. Since the trunk circuit must be held for sufficient time to return the audio intercept message, typically forty seconds or more, telephone switching equipment and trunk lines are tied up which could otherwise be utilized for improved customer service. Where intercept messages are returned between countries having different languages, a recorded intercept message in the language of the terminating country (from which the message is returned) may have no meaning to a person in an originating country of a different national language. A similar problem can arise where an intercept message is returned to a locality which has a significant bilingual population. An English-language intercept message returned from an end office will be meaningless to an originating-office telephone subscriber who speaks only Spanish. While the call-originating country could be equipped with apparatus for delivering prerecorded intercept messges in a number of different languages, the cost and complication of such duplication of equipment is evident.

Accordingly, it is an object of the present invention to provide an improved method and apparatus for delivering intercept messages.

It is another object of the present invention to provide an intercept message method and apparatus which reduces trunk holding time.

It is still another object of the present invention to provide an intercept message method and apparatus for delivering the intercept message in a language which is native to the originating telephone of the call.

It is still a further object of the present invention to provide a method and apparatus delivering intercept messages which is compatible with the existing North American telephone network and other telephone networks throughout the world and which will require a minimum of retrofitting of additional equipment to, or modification of generic programs of, existing central offices.

It is still a further object of the present invention to provide apparatus for the revertive intercept arrangement of the present invention which will also deliver intercept messages in a conventional manner when one of the central offices handling the call lacks the apparatus of the present invention.

It is still a further object of the present invention to provide a method of local delivery of intercept messages compatible with the existing format of common channel interoffice signaling (CCIS) message units.

That the present invention meets the objects of the invention as stated above will be apparent from the description to follow.

Stated in general terms, the intercept system of the present invention delivers intercept messages which are originated at the originating office, rather than at the destination office or at some intermediate switching location. When a message intercept condition occurs at the destination office or some other location remote of the originating office, an intercept message signal is returned to the originating office. This intercept message signal is used to actuate suitable announcement message apparatus associated with the originating office, so as to deliver an appropriate audio message to the calling party. A suitable signal for selecting an appropriate intercept message can typically be returned to the calling location in a few seconds or less, so that the trunk circuit can thereafter be released for other service.

Since the intercept announcement message is provided locally, the message can readily be delivered in the native language and idiom in response to a particular returned intercept signal. The originating office is equipped to forward an acknowledgement signal to the terminating office indicating that the originating office is properly equipped for local origination of intercept signals, whereupon the trunk circuit can be released; in the absence of such a returned confirmation signal within a predetermined time, the intercept message audio announcement can be returned over the trunk circuit to the originating office in the conventional manner, thus assuring compatibility of the present invention with originating offices that are not yet equipped with such apparatus.

DESCRIPTION OF THE DRAWING

FIGS. 4A and 4B are a block diagram of a pair of telephone central offices and an automatic intercept system according to the present invention.

FIG. 5 is a diagram of the trunk interface circuits of the automatic intercept system of FIG. 4.

FIGS. 6A–6C are a flow diagram of the operations executed by the controller for the automatic intercept system of FIGS. 4A and 4B.

DETAILED DESCRIPTION

Figure 1:
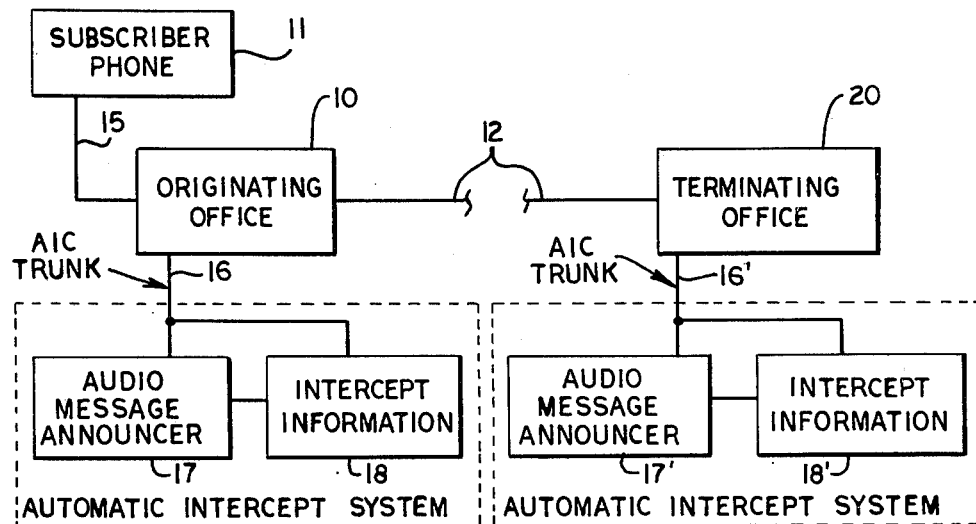
FIG. 1 is a block diagram which shows a disclosed embodiment of the present invention.

Turning first to FIG. 1, a block diagram of the telephone system employing the present invention is shown. An originating central office 10 is connected by subscriber loop 15 to subscriber telephone 11. The originating office is connected via a long haul trunk connection 12 to a terminating central office 20. Long haul trunk 12 may include several intermediate switching offices and should be understood to only diagrammatically represent one of two possible types of connections for which the present invention is particularly useful. The first is a long haul trunk connection for effecting a long-distance call. The second arrangement for which the present invention is especially useful is one in which trunk 12 represents a short haul trunk between central offices in a metropolitan area in which the majority of subscribers connected to each central office speak different languages.

Offices 10 and 20 are each connected to one of an identical pair of automatic intercept systems according to the present invention via conventional automatic intercept center (AIC) trunks 16 and 16'. AIC trunks 16 and 16' represent the conventional AIC trunk outputs from central offices 10 and 20. However, it should be understood that these trunk connections represent only short connections to automatic intercept systems 25 which will be physically located at the same place as the central office equipment. This will be contrasted to the present conventional arrangement as shown in FIG. 2.

Each of automatic intercept systems 25 includes an audio message announcer 17 and a control and storage arrangement for intercept information shown as 18. In the preferred embodiment of the present invention, message announcer 17 and intercept information control and store 18 are embodied in a single unit which is operated digitally. Of course, embodiments of the present invention could be constructed with conventional analog audio message announcers and other forms of intercept information control and store 18.

Figure 2:
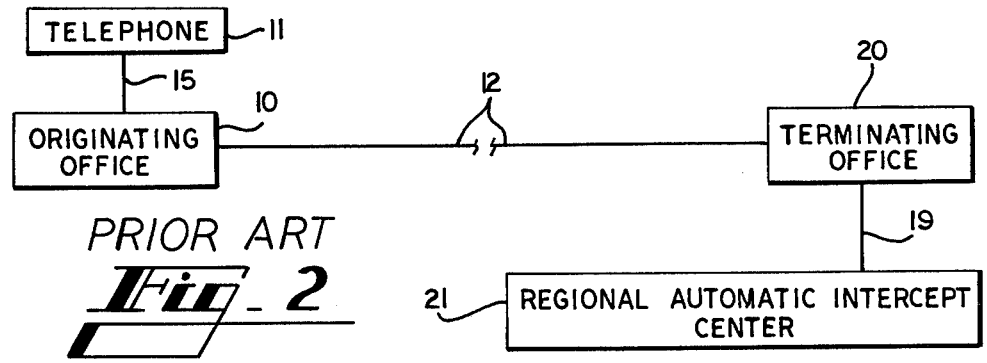
FIG. 2 is a block diagram of the conventional prior art intercept apparatus currently used in the North American telephone network.

Turning next to FIG. 2, a conventional prior art arrangement for delivering intercept messages is shown. Originating and terminating offices 10 and 20 are connected by trunk connection 12 as in FIG. 1. Subscriber telephone 11 is also connected through subscriber loop 15 to originating office 10. At terminating office 20, the conventional automatic intercept center (AIC) long haul trunk 19 connects terminating office 20 to a regional automatic intercept center 21. Prior art regional automatic intercept centers are several centers storing information for intercepted calls located throughout the United States. Each of these centers serves several states and is connected through several switching offices (not shown) to central offices in the region served by the center via a plurality of dedicated long haul trunks. Thus, as intercept messages are presently delivered, a substantial number of telephone trunks are dedicated as AIC trunks solely for the purpose of delivering intercept messages.

Assume for the moment that the subscriber having telephone 11 is attempting to call a number believed to be served by terminating office 20. Subscriber 11 dials the number which provides either dial pulse or DTMF signals over subscriber loop 15 to originating office 10. Originating office 10 forwards the called number information in a conventional manner over long haul trunk 12 to terminating office 20. Also assume that the number being called has been changed. Conventionally, this information will be stored at the regional AIC 21 serving terminating office 20.

When information on a particular number dialed is provided over long haul trunk 12, terminating office 20 will seek to make a connection to that particular number through a conventional arrangement of central office equipment. Terminating office 20 is equipped so that the only information provided when the called number is completely decoded is that the number requires an intercept message. Under these conditions, terminating office 20 detects the intercept condition and cuts the call through to one of the AIC long haul trunks connected to office 20 which, in the particular example, will be considered trunk 19.

When terminating office 20 becomes connected to regional AIC 21, the AIC provides conventional multi frequency (MF) signals through the connection over AIC trunk 19 requesting terminating office 20 to outpulse the number dialed which will have been stored at terminating office 20. Terminating office 20 pulses out the information which passes and over AIC long haul trunk 19 to the automatic intercept center 21.

Under computer control, regional AIC 21 delivers an appropriate audio message back over the link consisting of AIC trunk 19, the switching network of terminating office 20, long haul trunk 12, into originating office 10, out to subscriber loop 15, and ultimately to the originating telephone set 11.

Since such messages conventionally take anywhere from fifteen to forty-five seconds to deliver, the trunk capacity of the telephone network represented by trunks 12 and 19 is occupied for the entire time it takes to deliver the appropriate intercept message from AIC 21 to telephone 11.

It should also be noted that if a call to the same number at terminating office 20 is originated from a subscriber phone which is attached to terminating office 20, AIC long haul trunk 19 is still occupied for the entire time required to deliver the intercept message. Thus, the trunk capacity of the telephone network must include sufficient capacity to handle all intercepted calls as well as completed calls.

One of the primary purposes of the present invention is to allow the long haul trunk connection 12 to be dropped very shortly after the intercept condition is detected and to eliminate the use of AIC long haul trunks, such as trunk 19, so that more efficiency use of the trunk capacity of the telephone network may be made. Thus, the effective trunk capacity for handling both long haul calls and calls between different central offices in the same metropolitan area may be increased without adding additional physical trunk capacity when the present invention is used. Thus, less expansion of the physical capabilities of the network will be required. Ultimately, this will be reflected in a savings to the telephone subscriber. In the short term, use of the present invention can create additional revenue for the long-distance operating companies since the trunk connection may be dropped very quickly after the intercept condition is detected freeing the trunk for service of a revenue producing call. This is because answer supervision is not provided for an intercepted call and the caller is not charged.

Figure 3:
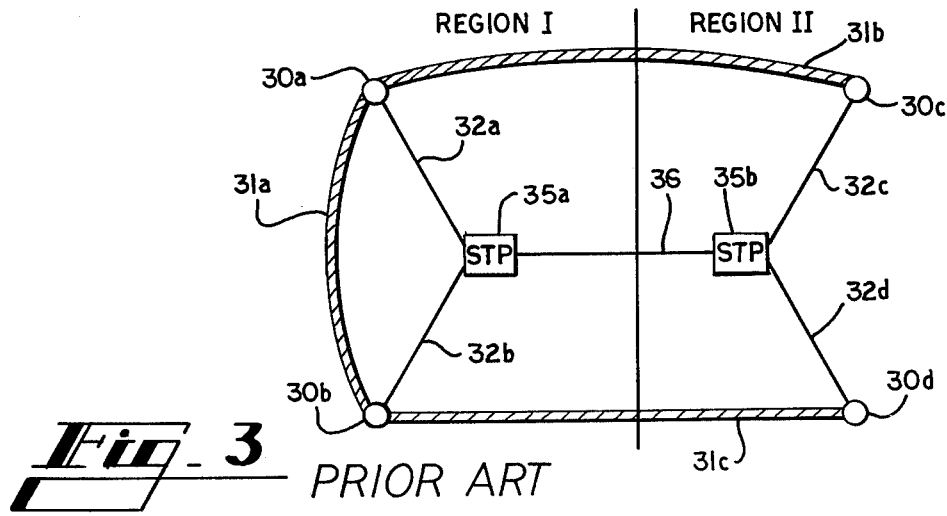
FIG. 3 is a block diagram of a set of telephone switching offices controlled by common channel interoffice signaling.

FIG. 3 shows a conventional nonredundant network topology for switching offices connected by common channel interoffice signaling links (CCIS). A plurality of switching offices 30a–30d are shown. Offices 30a and 30b are diagrammatically shown in arbitrary Region I and offices 30c and 30d are shown in another region denoted as Region II. Switching offices 30 are connected by a plurality of trunk groups designated as 31a–31c.

Switching offices 30a and 30b, in region I, are each connected via access links 32a and 32b, respectively, to signal transfer point 35a. Signal transfer point 35a is a signal concentrator and router for handling the signal traffic for controlling the trunk connections on trunk groups 31. Switching offices 30c and 30d are similarly connected by access links 32c and 32d to signal transfer point 35b. Signal transfer points 35 are interconnected by a bridge link 36.

It should be understood that, physically, access links 32 and bridge link 36 provide signaling in a common information channel. In the North American telephone network, conventions for defining the format of data transferred along links 32 and 36 have been defined. This arrangement is a species of packet switching in which packets of data are transferred among switching offices 30 over the common channel consisting of the links. The method of the present invention as embodied in a CCIS network, such as that shown in FIG. 3, is described hereinbelow in connection with FIG. 7.

Turning next to FIG. 4, the apparatus of the preferred embodiment of the present invention is described in detail. Central offices 10 and 20 are as represented in FIG. 1. It should be noted that central offices 10 and 20 and automatic intercept systems 25 and 25' are physically identical and the originating and terminating designation is used only by way of example in the present disclosure for indicating the source and destination of a particular telephone call. As will be appreciated from the detailed description to follow, the system is symmetrical and a call originating from terminating office 20 for a subscriber connected to originating office 10 would be handled in the same manner as described hereinbelow.

Central offices 10 and 20 each include a class of service (C.O.S) receiver 37. The provision of class of service receiver 37 is one of the modifications necessary to existing central offices in order to implement the preferred embodiment of the present invention. Class of service receiver 37 in the preferred embodiment is a receiver which must remain connected to trunk 12 on an outgoing call from originating office 10 for some predetermined period of time on the order of three to ten seconds to ascertain whether the particular class of service signal will be transmitted by terminating central office 20. In conventional present day central offices, once called number information has been outpulsed from the originating office, the office no longer looks for signals back from the terminating office as it has transferred control of the call (except for maintaining the connection while telephone 11 is off-hook) to the terminating office.

In its preferred form, an originating office from an outgoing trunk call will, under the control of the central office processor 38, connect a class of service receiver for the predetermined period of time. The preferred form is a particular set of multifrequency tones signaled from class of service receiver and sender 37 at the terminating office upon detection of the intercept condition indicating to the originating office 10 that the call has been intercepted at terminating office 20 and that terminating office 20 is equipped with an automatic intercept system according to the present invention. The generic program controlling the processor 38 of the originating central office must also be modified to activate cut through circuit 39 in response to receipt of the particular class of service signal from the terminating office. Of course, other signaling arrangements may be provided through the network from intermediate offices so long as receipt of the particular class of service signal at any originating office indicates that cut through circuit 39 should be activated. For example, either terminating office 20 or an intermediate class three or four office could provide a wink back to originating office 10 indicating the intercept condition and that the terminating office is properly equipped for revertive delivery of the intercept message. A plurality of AIC trunks 16 and 16' are connected with each office as described hereinabove in the conventional manner. In conventional present day arrangements, AIC trunk 16 would be connected to long haul AIC trunks such as trunk 19 (FIG. 2) to a regional automatic intercept center as described hereinabove in connection with FIG. 2.

As noted above, it is an object of the present invention to provide an revertive intercept arrangement which may be adapted to the present telephone network with a minimum of alteration to existing equipment. The block 39 labeled "cut call through to AIC" is a cut through circuit connected to C.O.S. receiver 37. The inclusion of C.O.S. receiver 37 and cut through circuit 39 constitutes the only alterations to the conventional central offices shown as 10 and 20. Cut through circuit 39 cuts the call on trunk 12, through to one of AIC trunks 16, upon the occurrence of a receipt of a particular class mark signal on the trunk.

It should be appreciated that the generic program processor 38 and the use of C.O.S. receiver sender 37 will activate cut through circuit 39. Once a connection on trunk 12 is cut through to one of AIS trunk 16, processor 38 of central office 10 can "ignore" the remainder of the activity since the AIS 25 remains ignorant of whether the seizure of one of its trunks was caused by a call originating locally to a local number, from an incoming trunk call or in response to the receipt of a return class of service signal. The procedure by which this determination is made is described hereinbelow. The cut through circuit of the preferred embodiment is a conventional circuit of the type use to cut through a call on detection of an intercept condition, modified to respond to the class mark signal. The class of service signal provided by C.O.S. receiver sender 37 of terminating office 20 serves as an intercept message control signal indicating to the originating office that the terminating office is properly equipped to practice the preferred embodiment of the present invention. In response to having a trunk seized, each AIS will generate a particular multifrequency tone pair designated as a "MF interrogation signal". This will be generated after the AIS at the terminating office has been connected, as described hereinbelow, to trunk 12. As will be appreciated from the description of operation of automatic intercept system (AIS) 25 in connection with FIG. 6, the MF interrogation signal serves as an acknowledgement signal when transmitted from originating office 10 to terminating office 20 in operation of the preferred embodiment.

The details of the automatic intercept system (AIS) 25 used in the preferred embodiment are shown in connection with the AIS associated with originating office 10. AIS 25 is controlled by a central processing unit (CPU) 40. CPU 40 communicates with other elements of AIS 25 over a coventional set of data and address buses shown collectively as 41. Attached to buses 41 is vocabulary and program read only memory 42 which provides instructions for controlling CPU 40 and digitized vocabulary signals for providing audio intercept messages. Also connected to buses 41 is an array of random access memory 45 which includes one or more called numbered registers designated as 46. Random access memory 45 is conventional in nature and is used to store intermediate information necessary for the operation of AIS 25. AIS 25 is connected to central office 10 via a plurality of AIS trunks 47a–47n. Each of the trunks 47 is connected to buses 41, and thus to CPU 40, through one of trunk interface circuits 48a–48n. Trunk interface circuits 48 are described hereinbelow in connection with FIG. 5.

An audio connection to trunks 47 is provided from each of trunk interface circuits 48 along lines 49a–49n to an analog multiplexer 50. Analog multiplexer 50 has (N+1) inputs thereto for N trunks served by AIS 25 and can provide a connection between any one of these inputs (T1-TN) to output line 51 which is connected to a half duplex modem 52 of conventional construction. Additionally, an input denoted as T(N+1) is provided to analog multiplexer 50 to effect a connection between line 55 and output line 51 when desired.

In the preferred embodiment, half duplex modem 52 is embodied as a 1200 bit per second half duplex modem compatible with the Bell-type 202A. It will be known to those skilled in the art that such modems are half duplex 1200 bit per second modems embodied as four phase differential phase shift keyed modulation modems having a 600 baud keying rate.

The particular input of analog channel multiplexer 50 which is connected to output line 51 at any given time will be determined by a signal latched from data and address buses 41 which are shown as connected to multiplexer 50. Conventionally, CPU 40 will cause a signal to be written onto buses 41 which addresses the multiplexer 50, and will latch information from the data bus onto the inputs of multiplexer 50 indicating the particular input channel of multiplexer to be connected to output line 51.

Thus, a voice grade audio link over one of lines 49 may be effected between half duplex modem 52 and one of trunk interface circuits 48 under the control of CPU 40. Also, line 55 may be connected to half duplex modem 52.

As information for intercept messages is received at some central location, such as a telephone company business, it may be entered via entry terminal 56 which is connected by an RS 232 link shown as 57 to a second 600 baud modem 58. In the preferred embodiment, modem 58 is of the same type as modem 52. It will of course be appreciated that full duplex modems may be used in implementing the present invention, but are not necessary.

When the telephone company receives information concerning a number which will require an intercept message, it is keyed in by an operator via entry terminal 56 and is provided through modems 58 and 52 to AIS 25. Information is then stored in random access memory 45. For example, if a number has been disconnected, information concerning the particular number which has been disconnected, together with a coded signal indicating that the audio message "has been disconnected" should be delivered as the intercept message, will be stored in random access memory 45.

If a number has been changed, similar information will be entered at entry terminal 56 and stored in random access memory 45. In this instance, the original number which will provide the intercept condition when called, together with coded information indicating that a new number signal follows, followed by digits defining the new number, are stored in RAM 45.

It should be apparent from the foregoing description that AIS 25 is particularly well suited to local provision of audio intercept messages. This is true even if the telephone system in question is not equipped for practicing the present invention. AIS 25 will provide local intercept messages simply by connecting the trunks 47 of the AIS to the AIC trunk 16 from the conventional central office 10.

It should be recalled that one of the rationales for originally setting up regional automatic intercept centers was that the economics of a computerized AIC dictated that a small number of large installations should be constructed and that trunk capacity, such as that represented by trunk 19, was cheaper than computerized automatic intercept. In recent years, it has become more feasible to distribute the automatic intercept function to smaller installations in favor of saving trunk capacity. Thus, when the environment of the present invention is contemplated, AIS 25 will preferably be a local automatic intercept system physically located at the particular central office 10. While such a system may serve several local offices via connections to their conventional AIC trunks, this may be done on a local basis freeing the long haul capacity for long distance calls. However, for purposes of the present disclosure, it will be assumed that each automatic intercept system 25 is associated with one local office in the network and that some offices are not so equipped.

Before turning to a description of the operation of AIS 25, the construction of trunk interface circuits 48 will be discussed in connection with FIG. 5. A typical one of trunk interface circuits 48 is shown in FIG. 5. The trunk interface circuit (TIC) communicates with CPU 40 via parallel input output controller 59. In the preferred embodiment, PIO 59 is embodied as the Z-80 PIO currently manufactured by Zilog Incorporated of Cupertino, Calif. and will be understood by those skilled in the art to be a member of the Zilog Z-80 chip set. The bidirectional ports of PIO 59 are represented collectively at 60 in FIG. 5. PIO 59 is connected to a set of FIFO buffers 61 which are linked along data bus 62 to parallel-to-serial converter 65. The output of parallel to serial converter 65 is provided along line 66 to CVSD digital to analog converter 67. Converter 67 is a continuously variable slow delta modulation digital to analog converter of a type known to those skilled in the art. It should be appreciated that digitally coded vocabulary words, coded in the continuously variable slow delta modulation format, are stored in vocabulary ROM 42 (FIG. 4) and are provided to digital to analog converter 67 to deliver audio messages onto trunk 47. FIFO buffers 61 are provided so that when an audio message is being provided out onto trunk 47, enough information may be loaded by CPU 40 (FIG. 4) into buffers 61 so that a continuous audio output will be provided while the CPU serves other trunk interface circuits of the AIS and performs other control functions necessary to maintain operation of the AIS.

A more detailed description of this type of digital audio message announcer including a CVSD converter and buffered inputs to the converter may be found in application Ser. No. 246,733, filed Mar. 23, 1981, entitled "Digital Announcement System Including a Remote Loading and Interrogation" which is assigned to the assignee of the present application. Said application Ser. No. 246,733 is hereby incorporated by reference exactly as if set forth in full herein.

The remaining circuitry of trunk interface circuit 48 consists of a seizure detector and controller 68, a multifrequency receiver and transmitter 69 and the multifrequency interrogation tone oscillator 70. Seizure detector and controller 68 communicates with CPU 40 via the bidirectional ports 60 of PIO 59. An output is provided on line 71 from seizure detector and controller 68 to activate MF interrogation signal oscillator 70. Upon each occurrence of a seizure of trunk 47 detected by seizure controller and detector 68, a logical transition (from zero to one) is provided along line 71 which activates MF interrogation oscillator 70 to produce a burst of the tone pair defined as the MF interrogation signal. This tone burst appears on line 72 which is connected to trunk 47. Thus, a simple arrangement is provided for producing a burst of the MF interrogation signal over trunk 47 upon each occurrence of a new seizure of trunk 47. Since trunk 47 is only seized on "incoming calls", seizure detector and controller 68 may be of simple conventional construction and does not need to seize the trunk for "outgoing calls".

MF receiver transmitter 69 is of conventional construction and is provided with a voice grade audio link from trunk 47 over lines 75. The digital output of MF receiver 69 is provided to a portion of bidirectional port 60 of PIO 59. Line 49 is identical to one of lines 49 shown in FIG. 4 and is an audio connection from trunk 47.

Upon a new seizure of trunk 47, seizure detector and controller 68 provides an appropriate supervisory signal back out over the trunk 47 indicating to the AIC trunk from the central office that the intercept call has been "answered" and also provides, through PIO 59, information back to the CPU 40 (FIG. 4) that this particular trunk has answered a call so that "housekeeping" information may be provided to the CPU to keep track of what calls are being answered by particular trunks of the AIS.

Figure 6A:
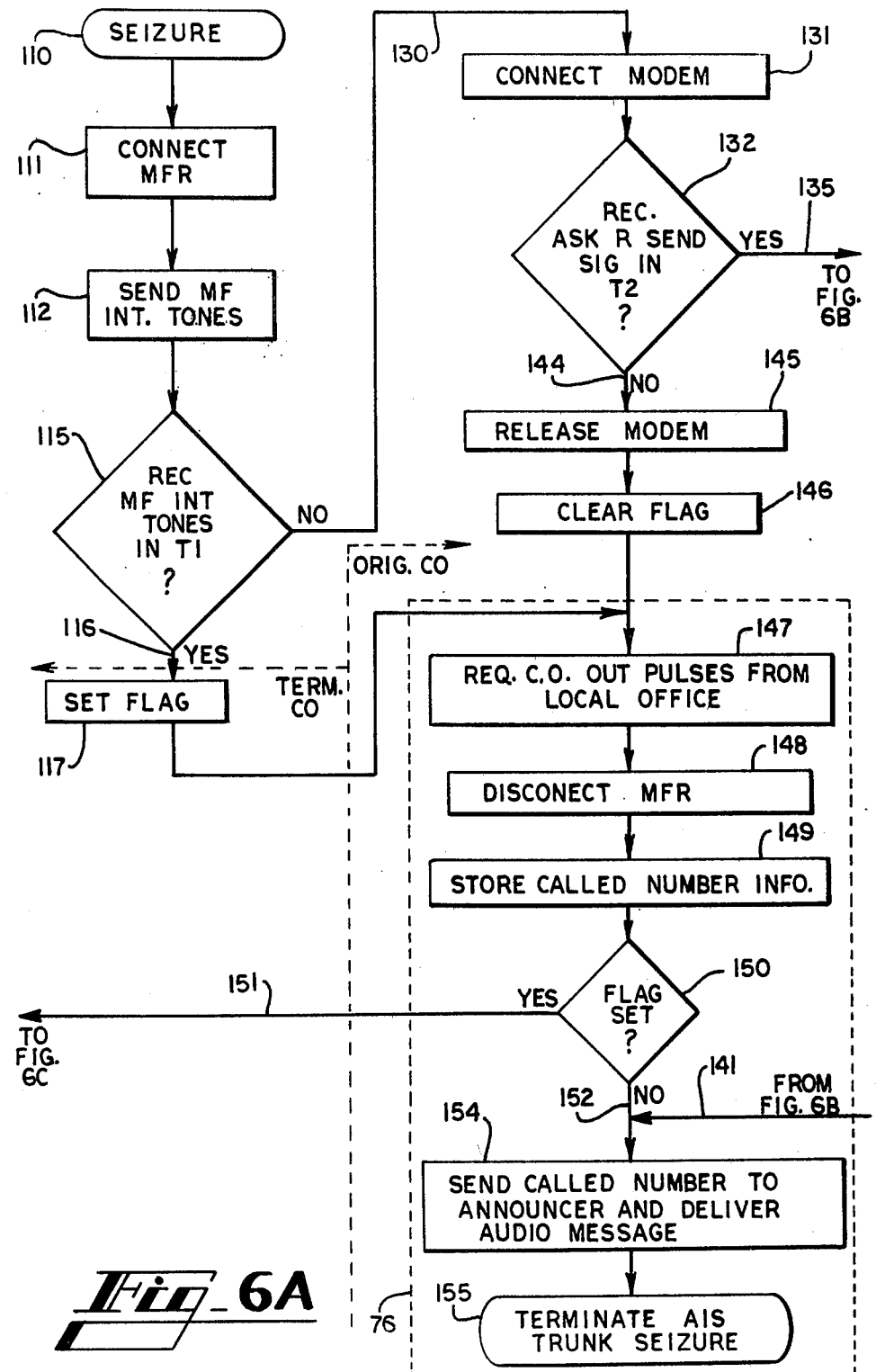

Turning next to FIG. 6, the control program for each AIS 25 is shown as a flow chart. Before beginning a detailed description of the sequence provided by the AIS, several salient features will be mentioned. A single sequence of operations is provided to control each AIS and is provided for each call received on one of the AIS trunks. Through decisional instructions, primarily whether a particular signal is received within a predetermined time, the controller of the AIS determines whether or not the intercept condition originated at a remote central office equipped with a similar AIS for implementing the present invention. The AIS also determines if it is located at a terminating office which is communicating with an originating office equipped with a similar AIS. In the event that neither of these conditions is fulfilled, or all trunks of the originating office AIS are busy, the AIS will deliver the conventional functions of prior art automatic intercept centers. This occurs when either the incoming call originated on a subscriber line of the local central office or when the incoming call originated at a remote central office which is not equipped with apparatus for practicing the present invention. The determination of whether the AIS is communicating with a similarly equipped AIS may be made in a time period on the order of a second. The rate limiting step is the speed at which the central office C.O.S. receiver 37 is processor 38 (FIG. 4) may activate the cut through circuit 39.

The other important feature of the controller of the present invention is that the only modification required of the central office equipment is the provision of cut through circuits 39 and the provision of C.O.S. receiver senders 37 and the slight modification to the program of processor 38 as described hereinabove. It will be appreciated from the following description that the processor 38 from each central office does not have to maintain any record of whether the seizure of any particular AIS trunk was made in response to a return class of service signal from a distant office. Through the MF interrogation signal and the PSK ready/send (RSEND) and ready/receive (RREC), the respective automatic intercept systems 25 determine the proper response to make to each other or to go ahead and provide conventional remote delivery of the audio intercept message.

In the flow chart of FIG. 6, the steps to be executed are numbered and the possible branches taken from decisional steps are also numbered. It should be noted that CPU 40 (FIG. 4) may be executing the control sequence shown in FIG. 6 at various locations in the sequence for various trunks, at any given time. The sequence shown in FIG. 6 is for one seizure of one particular trunk.

The control sequence begins at step 110 which is denoted as a new seizure of one of trunks 47 of the AIS. The multifrequency receiver 69 (FIG. 5) of trunk interface circuit 48 is connected to trunk 47 at step 111. Next, the MF interrogation tones are transmitted out over trunk 47 at step 112.

The next step is the sequence is decisional step 115. CPU 40 causes the particular trunk in question to wait a predetermined time, designated as T1, to determine if a burst of the MF interrogation tone pair is received. This is accomplished by CPU 40 starting one of a plurality of counter-timers. If the MF interrogation signal is received, the YES branch 116 is taken from step 115. Consideration of the apparatus shown in FIG. 4 will indicate that if the AIS trunk receives the MF interrogation signal at step 115, it will "know" that it is at the terminating central office of an intercepted call which originated at a remote central office. Applying this logic to FIG. 4, the taking of branch 116 indicates that the particular AIS is AIS 25' associated with terminating office 20.

This occurs because of the following. When the intercept condition was first detected by central office 20, trunk 12 was automatically cut through to one of AIC trunks 16' in a conventional manner. When this occurred, AIS 25' transmitted the MF interrogation tone pair at step 112. Originating central office 10 received and ignored the MF interrogation tone pair. It should be understood that the generic program of processor 38 is arranged to seize an AIS trunk 16' upon detection of the intercept condition. When it determines that it has successfully seized an AIS trunk, it activates the sender portion of class of service receiver sender 37 to transmit the C.O.S. signal back on trunk 12 to originating office 10. Thus it will be appreciated that when one of the AIS trunks 16' at the terminating office is seized, the MF interrogation signal transmitted in response to that seizure is ignored. This is because this occurs immediately upon seizure before the class of service mark is sent back to the originating office indicating that, if a properly equipped AIS is present at that central office, one of its trunks should be seized and connected to trunk 12.

When a trunk 16 of AIS 25 at the originating office is seized, it transmits its MF interrogation signal but the terminating AIS is now connected to line and can receive same. Thus, AIS 25 at the originating office transmitted the MF interrogation signal which was detected at step 115 at the AIS 25' of the terminating office.

Thus, receipt of the MF interrogation tone pair at step 115 is a handshaking signal indicating to the AIS that the C.O.S. signal transmitted has been received by a similarly equipped AIS at an appropriately equipped central office, that the call was cut through at the remote office to the AIS, and that both AISs are now connected over trunk 12 to each other for communication.

As is shown by dotted line 80 on FIG. 6, the sequence of control steps on the left side of line 80 represents steps executed by AIS 25' associated with terminating central office 20. Those to the right represent steps executed by AIS 25 at originating central office 10 when both central offices are equipped to implement the present invention.

Before continuing with the sequence of operations at the terminating AIS, the next decisional step from negative branch 130 will be considered.

Consider that the AIS executing the routine shown in FIG. 6 failed to receive the MF interrogation tones at step 115 within time T1. This being the case, the controller implemented by CPU 40 will take negative branch 130 from step 115. The next step in the sequence is to connect modem 52 (FIG. 4) to the particular trunk at step 131 and to wait a second predetermined time period, T2, to see if a phase shift keyed signal indicating ready to send (RSEND) is received. Step 132 represents the only condition in the entire sequence of AIS operations in which the MF receiver and the modem are both connected to the same trunk. It is quite simple to select a conventional 1200 bit per second PSK digit sequence which will not activate MF receiver 69 in a manner which emulates receipt or the MF interrogation tone.

It should be understood that, at step 131, CPU 40 provides appropriate signals over buses 41 to analog multiplexer 50 to connect modem 52 to the particular one of lines 49 associated with the trunk under consideration. At step 132, receipt of the phase shift keyed RSEND signal within time period T2, indicates to the CPU that it is in the AIS at the originating central office and, furthermore, that it is now in communication with another central office with a similarly equipped AIS. Thus, if the YES branch 135 is taken from step 132, MFR 69 is disconnected at step 136 and the appropriate handshaking and information transfer takes place between the two AIS units implementing the present invention.

If the No branch 44 is taken from step 132, the AIS controller knows that it has not received the MF interrogation tones, and furthermore that it has not received the PSK RSEND signal from another remotely located AIS. Thus, it may be determined that one of two conditions exists to which the sequence following branch 144 is an appropriate response. Either the intercept condition originated at the same central office in which the AIS is located, and thus the subscriber set at which the call originated and the number being called are both numbers unique to the particular local central office to which the AIS is connected. The other possibility is that this particular AIS is at the terminating central office and the originating central office is not equipped with an AIS according to the present invention or that all AIS trunks at the originating office are busy. Thus, in either case, it is appropriate for the sequence of conventional intercept message delivery steps indicated within block 76 to be transmitted. Under these conditions, the conventional sequence of intercept message delivery steps will be taken after modem 52 (FIG. 4) is released at step 145. One flag, which is preferably embodied as one bit in a status register of CPU 40, is cleared at step 146 when the path from NO branch 144 is being executed. This particular flag will be tested at step 150 at the end of the next three sequence of steps to determine whether the particular routine consisting of steps 147, 148 and 149 was entered from the NO branch 144 of decisional step 132 or the YES branch 116 of decisional step 115. A multifrequency signal is sent step 147 requesting the terminating central office to connect a sender and outpulse the called number. The MFR is disconnected at step 148 and the received information on the called number is stored at step 149. At step 150 the flag is tested. In the sequence described immediately above, the flag will be cleared so NO branch 152 will be taken. From this branch the conventional delivery of the audio intercept message proceeds. At step 154 the called number information is sent to the announcer and the vocal message is delivered out over the trunk. At step 155, AIS trunk seizure is terminated by providing an appropriate signal to seizure detection and control block 68 through PIO 59 (FIG. 5).

Returning once again to the YES branch 116 from step 115, the sequence of steps executed by an AIS at the terminating central office is shown. Keeping in mind that once branch 116 is taken, the AIS has determined that it is at a terminating central office and in communication with an AIS constructed to practice the present invention, it first executes step 117 which is the setting of the flag bit described hereinabove. Once this flag is set, the routine next steps to the above-described sequence of steps 147 through 149 requesting the originating central office to outpulse the called number in a conventional manner. This is done in the MF signal format.

Next, the flag testing step 150 is encountered and it should be apparent that YES branch 151 will be taken. This leads next to the execution of step 119 connecting modem 52 to the trunk. It should be noted that at step 149, each time it is executed, the called number information is stored in a digital format in random access memory 45 (FIG. 4). It should be understood that this will be stored in an appropriate register of RAM 45 which is denoted as the called number register 46 as shown in FIG. 4.

At step 120, the terminating central office transmits, in the PSK format, the RSEND signal discussed hereinabove. At step 121, the AIS is waiting a predetermined period of time, T3, for a handshaking signal indicating that the originating central office is ready to receive (RREC). If the signal is not received, NO branch 125 is taken to default disconnect step 122 which terminates the operation. Of course, it is within the level of skill in the art to provide a PSK signal requesting that the sequence be reinitiated some predetermined number of times before transfer of the information is considered to be a failure.

Assuming that the RREC signal is received within predetermined time T3, YES branch 126 will be taken from step 121. Thus, handshaking signals have been exchanged in a PSK format indicating to the AIS at the terminating CO that the AIS at the originating CO is ready to accept information in a PSK format relating to the called number. At step 126, the called number information is transmitted. The AIS will receive a sequence of PSK bits which indicates the type of intercept message to be delivered. This information will always include a PSK transmission of the digits dialed, and may be terminated by either a sequence of bits to indicate the message type or a sequence of bits indicating that new number information follows, followed by a PSK representation of the new number.

An example of the first would be an indication that a particular number has been disconnected. After appropriate synchronization bits, seven BCD digits, followed by a four bit code for the message type, are transmitted. For example, the particular message may be that number ABC-DEFG has been disconnected. An example of the other type would be an indication that the number had been changed to a new number followed by a BCD representation (encoded in PSK) of the new number. Once this information is transmitted, the modem is released to step 127 and the trunk 12 (FIG. 4) is disconnected via trunk disconnect signal at step 128. Following this, the seizure of the AIS trunk is terminated at step 129.

Note that all information concerning the intercept message to be delivered is transmitted within a relatively short time period, at least one order of magnitude shorter than the time required to actually deliver the audio message. Once appropriate handshaking has taken place, as described above, all information necessary for the AIS at the originating office is transmitted in PSK format and the long haul trunk 12 may be immediately dropped and becomes available for more productive service.

Returning to the sequence of operations at the originating central office, it will be appreciated that they are, in effect, a mirror image of those described for the terminating office. Recall that when YES branch 135 is taken from step 132, the AIS has determined that it is at an originating central office and in communication with a remote AIS equipped to practice the present invention. Upon this determination, the MFR is disconnected at step 136. When this is done, the RREC signal is transmitted in PSK format at step 137; which will be followed by receipt of the called number information in the PSK format at step 138. Of course, it is within the ordinary skill of the art to request retransmission in the event of detection of a parity error or failure to receive complete information and such is not shown as a separate loop in the flow chart.

When the information has been received, decoded, and stored at step 138, the modem is released at step 139 and the trunk disconnect tone is transmitted as step 140, thus freeing the long haul trunk. When this has been accomplished, branch 141 leads into previously described step 150 of the conventional delivery of the intercept message.

It should be noted from inspection of FIG. 6 that step 154 may be reached by either branch from step 132 can be reached in a time period less than three seconds. The time-consuming step in the entire sequence shown in step 154, the delivery of the actual audio message. Thus, the time consuming step 154 is reached through operation of the apparatus according to the present invention and the long haul trunk has been occupied only for a few seconds. The audio message will now be delivered to subscriber loop 15 from AIS 25 without occupying any long haul trunks, or any short haul trunks connecting central offices in the same area.

From the foregoing it will be appreciated that the cut through to the AIC at the terminating office, which is done in a conventional manner, includes means at the terminating location which are operative in response to an intercept condition to produce the class of service signal transmitted back to the originating office. The occurrence of the C.O.S. signal is an intercept message control signal which corresponds to the fact that a desired audio intercept message should be delivered to the calling party at the originating location. The C.O.S. sender 37 comprises a means for returning the intercept message control signal from the terminating location, over trunk 12, to the originating location. AIS 25 (FIG. 4) and each of the trunk interface circuits 48 shown in FIG. 5 constitute a means at the originating location to generate a selected audio intercept message to the calling party at telephone 11 from the originating location.

Similarly, the MF interrogation oscillator 70 (FIG. 5) at the originating location comprises a means at the originating location operative in response to the intercept message control signal for forwarding an acknowledgement signal to the terminating location, as is done at step 112 of the control routine shown in FIG. 6. The acknowledgement signal, as embodied by the MF interrogation tone returned by the originating location, indicates the originating location is capable of originating the audio intercept message in response to the intercept message control signal.

Figure 7:
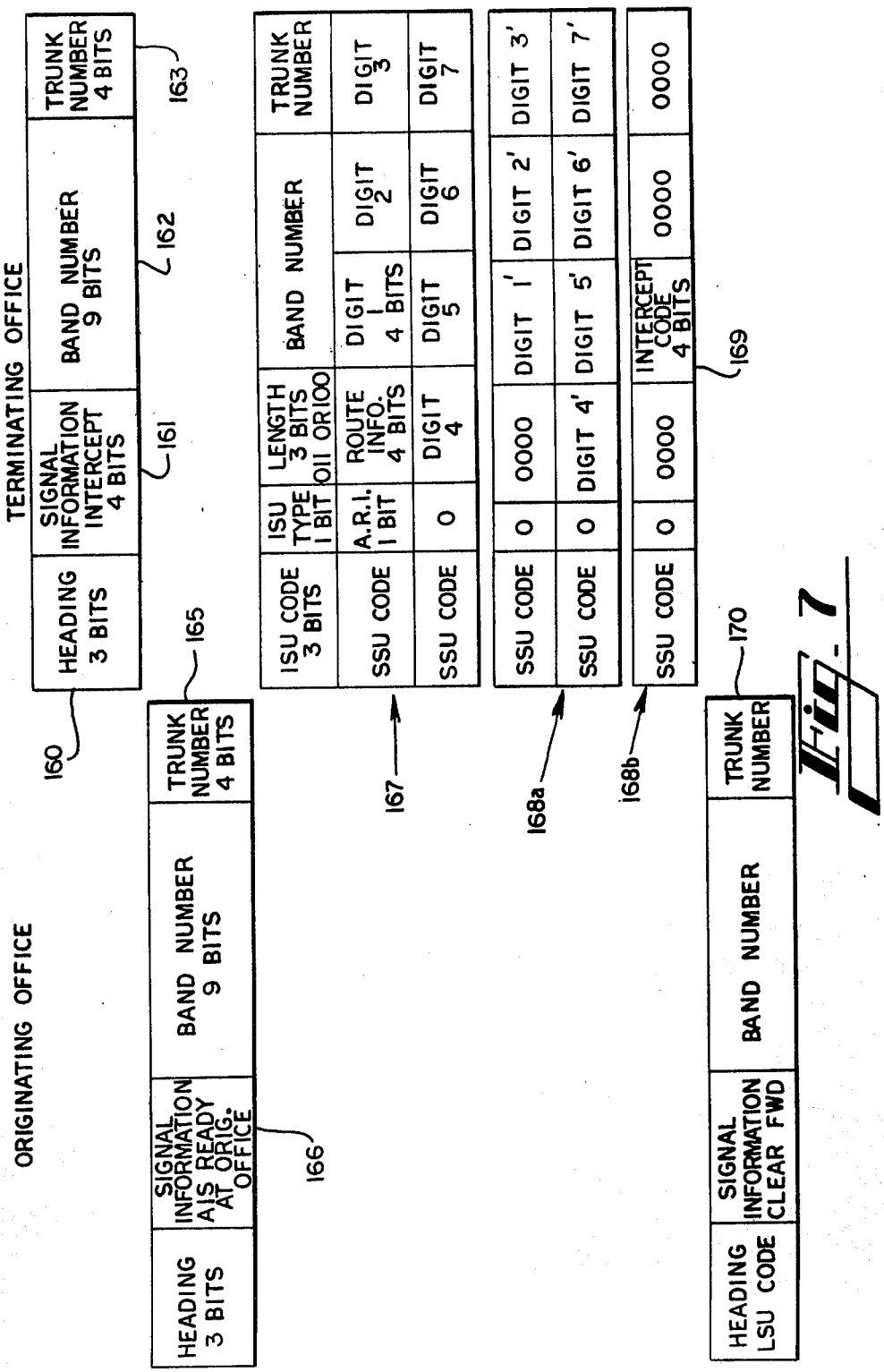
FIG. 7 shows the message unit format of the preferred embodiment of the method of the present invention on a system employing common channel interoffice signaling.

Turning next to FIG. 7, the message format for practicing the method of the present invention in a telephone network equipped with common channel interoffice signaling (CCIS) is shown. It should be remembered that a basic nonredundant CCIS scheme of signaling is shown in FIG. 3. The method of the present invention may also be practiced on a CCIS network with a redundant topology.

As is known to those skilled in the art, the basic format of the information packets (message units) of the North American CCIS is a twenty-eight bit packet normally communicated over 2400 bit per second modems. The last eight bits of each message unit constitutes eight check bits used for error detection and there have been omitted from the format of the message signal shown in FIG. 7.

A more detailed description of CCIS message units may be found in Section 6 of "Notes on Distance Dialing", 1975, published by the American Telephone &

Telegraph Company, which is herein incorporated by reference.

Assume for the moment, in reference to FIG. 3, that the originating switching office is office 30b in Region I and that the destination of the call is terminating office 30c in Region II. Upon detection of an intercept condition at office 30c, the CCIS intercept message control signal 160 is transmitted. This message is provided along access link 32 to signal transfer point 35b, from which it is routed along bridge link 36, to signal transfer point 35a and on to originating switching office 30b.

Switching office 32 is equipped with a modem appropriate for the format of the CCIS signal.

Intercept message control signal 160 has a format of a standard lone signal unit (LSU) of the CCIS standard. The first three bits are a three-bit heading. The following four bits, noted as 161, are the signal information bits which indicate to the receiving office the nature of the information being transferred from the terminating office.

Thus, one of the sixteen possible combinations for the four-bit signal information nibble for a lone signal unit of the CCIS is dedicated to being an intercept message control signal indicating to the originating office that an intercept condition has occurred.

The remaining thirteen bits of the LSU are a nine-bit band number identifier and a four-bit trunk number (within the band) identifier. As noted above, the eight check bits from the format are not shown on FIG. 7. Thus, it will be appreciated that a total of thirteen bits are provided in blocks 162 and 163 in the LSU format, thus allowing slightly more than eight thousand trunks to be identified by the particular signal unit.

Upon receipt of intercept message control signal 160 at originating office 30b, a CCIS acknowledgement signal shown as 165 is transmitted back to the terminating office. The four-bit signal information nibble shown as 166 will have a unique bit combination indicating to the terminating office that the AIS at the originating office is ready to receive information on the appropriate intercept message and, further that the originating office is equipped with an AIS as shown in FIG. 4 for local delivery of audio intercept messages. Thus, it will be apparent that two of the sixteen possible signal information bit combinations for lone signal units must be devoted to handshaking between the AIS units for local delivery of an intercept message according to the present invention.

Upon receipt of the acknowledgement signal 165, terminating switching office 30c provides a multiple message unit (MSU). There are two possible standard formats for the multiple message unit for practicing the method of the present invention. The three message units shown as 167 in FIG. 7 will be common to either of the called number information MSUs transmitted from the terminating office.

A standard initial signal unit (ISU) is the first signal unit of MSU 167. The first four bits contain the standard ISU code and ISU type bit. The next three bits are the length bits which indicate the number of subsequent signal units (SSUs) to follow which comprise the entire MSU. As noted on FIG. 7, either three or four (binary 011 or 100) SSUs will be transmitted from the terminating office to the originating office.

The first SSU following the ISU begins with the standard SSU code, and is preferably followed by a one bit flag indiating that abbreviated routing information (ARI) follows, rather than full routing information, in the next four bits. The remaining twelve bits of the first SSU are three BCD digits of the number dialed. The second SSU begins with the SSU code, followed by a zero at the fourth bit position, followed by the four remaining four-bit BCD digits of the remainder of the number dialed.

Thus, by the signaling arrangement shown, the identity of the number dialed for which the call was intercepted at the terminating office is transmitted back to originating office 30b. This is done so that the number called by the calling party will be transmitted verbally to the caller as a part of the intercept message.

The remainder of the multiple signal unit containing information appropriate for forming the audio intercept message will take the form of either two subsequent signal units, shown as 168a, or a single subsequent signal unit, shown as 168b. The two SSU format, shown as 168a, is provided only when the called number has been changed and the new number should be identified to the caller. The originating office can unambiguously determine that this is the type of intercept message to be delivered when the three length bits in the ISU which immediately follows intercept message control signal 160 are 100. If the ISU indicates that four SSUs are to follow, the originating office will immediately be alerted that the type of intercept message is one in which the called number has been changed to a new number, both of which should be received, stored, and identified in the audio intercept message. Thus, the two SSU format 168a includes the remaining two SSUs used in this particular multiple signal unit, and provides seven BCD digits identifying the new number to which the called number has been changed.

In the event that no new number information is stored at terminating office 30c, the remaining SSU, shown in a generalized format as 168b in FIG. 7, will be transmitted. Under these circumstances, the originating office will respond to the fact that three SSUs are to follow (as alerted in the initial ISU of 167) and that an intercept code will be provided in bits 9–12 of the last SSU of this MSU. This four-bit code is shown as block 169 of SSU 168b. Sixteen possible codes for the types of intercept messages are more than sufficient to identify presently used intercept messages which do not include information on a changed number. For example, one of the four-bit combinations could signal that a "not in service" message should be delivered. Another of the combinations of nibble 169 will indicate that a "has been disconnected" intercept message should be delivered, and so forth.

Upon receipt of the complete four unit or five unit (which includes the initial signal unit) MSU by originating office 30b, the standard LSU for a clear forward signal, which is shown as 170 in FIG. 7, is transmitted from originating office 30b to terminating office 30c. The CCIS equipment is then alerted to terminate the attempt to set up a call on the trunk identified by the nine-bit band number and the four-bit truck number, and to release this trunk for other service. The entire operation for transmitting the signal units shown in FIG. 7 takes place in the time on the order of one or two seconds. Thus, the connection of the audio link over one of the trunk groups 31 (FIG. 3) is never established under the circumstances since this exchange of information takes place prior to establishment of the standard CCIS continuity check.

Therefore, practicing of the method of the present invention on CCIS systems guards a particular trunk only for a period of about one seconds while the CCIS system is attempting to establish whether the call can be completed. Upon transmission of the clear forward signal 170, the trunk is released back to the system for use on other calls. Note under these circumstances that all information pertaining to the identity of the number called, any new number information, and the type of intercept message to be delivered is transmitted over the common information channel of the CCIS and does not involve transmission of information over the trunks.

While the embodiments of the present invention which have been disclosed herein are the preferred forms and believed to be the best mode of practicing the present invention for both conventional equipment using multifrequency supervisory signals and for a CCIS network, other embodiments of the method and apparatus of the present invention will suggest themselves to persons skilled in the art in view of this disclosure. Therefore, the scope of the present invention should be limited only by the claims below.

I claim:

1. A method for delivering an audio intercept message at a call originating location in response to an intercept signal returned from a call terminating location, comprising the steps of:

recognizing an intercept condition occurring at the terminating location, in response to a call originated by a calling party at the originating location;

producing at said terminating location an intercept message control signal which corresponds to a desired audio intercept message;

returning said intercept message control signal from said terminating location to said originating location;

originating a selected audio intercept message at said originating location for delivery to the calling party at said originating location, in response to said intercept message control signal returned from said terminating location;

producing at the originating location an acknowledgement signal in response to said intercept message control signal and forwarding said acknowledgement signal to the terminating location, if and only if the originating location is capable of originating said audio intercept message in response to said intercept message control signal; and originating an audio intercept message at the terminating location for audio transmission to the calling party at the originating location, if said acknowledgement signal is not received at the terminating location within a predetermined time after the intercept message control signal was returned to the originating location.

2. The method as in claim 1, wherein:

said originated call occurs on a selected trunk circuit connected between the originating and terminating locations;

said intercept message control signal is returned from said terminating location to said originating location via said selected trunk circuit; and said selected trunk circuit is released from said call upon reception of said intercept message control signal at said originating location, so that said released trunk circuit is available for other message purposes while said audio intercept message is being originated at said originating location.

3. The method as in claim 1, wherein:

at least one trunk circuit is available to interconnect said originating and terminating locations; and said intercept message control signal is returned from said terminating location along an interoffice signal channel which is separate from said trunk circuit.

4. Apparatus for originating an audio intercept message at a call originating location for delivery to a calling party at the originating location, in response to an intercept signal originated at a call terminating location and returned from the call terminating location, comprising in combination:

means at said terminating location operative in response to an intercept condition occurring at the terminating location to produce an intercept message control signal which corresponds to a desired audio intercept message to be delivered to the calling party at the originating location;

means for returning said intercept message control signal from said terminating location to said originating location;

means at said originating location operative in response to said returned intercept message control signal to generate a selected audio intercept message for delivery to the calling party at the originating location, instead of originating an audio message at the terminating location and returning the audio message along a voice circuit to the originating location for delivery to the calling party; and means at said originating location operative in response to said intercept message control signal to forward an acknowledgement signal to said terminating location;

said acknowledgement signal indicating the originating location is capable of originating said audio intercept message in response to the intercept message control signal.

5. A method for originating an audio intercept message at a call originating central office of a telephone system for delivery to a calling party at the originating central office, in response to an intercept signal originated at a call terminating central office of the system and returned from the terminating central office, comprising the steps of:

recognizing an intercept condition at the terminating central office in response to a call originated by a calling party at the originating central office;

producing at said terminating central office an intercept message control signal which corresponds to a desired audio intercept message;

returning said intercept message control signal from said terminating central office to said originating central office;

originating a selected audio intercept message at said originating central office for delivery to the calling party at said originating central office in response to said intercept message control signal returned from said terminating central office, instead of originating the audio message at the terminating location and returning the audio message along a voice circuit to the originating location for delivery to the calling party; and producing at the originating central office an acknowledgement signal in response to said intercept message control signal and forwarding said acknowledgement signal to said terminating central office, if and only if the originating central office can originate the audio intercept message in response to the intercept message control signal.

* * * * *